United States Patent [19]

Blackburn

[11] 4,218,993
[45] Aug. 26, 1980

[54] METHOD AND APPARATUS FOR ACCOMPLISHING FLAME IGNITION FOR AN INTERNAL COMBUSTION ENGINE

[76] Inventor: Donald E. Blackburn, 1073 W. Outer Dr., Oak Ridge, Tenn. 37830

[21] Appl. No.: 20,542

[22] Filed: Mar. 14, 1979

[51] Int. Cl.² ............................................. F02B 19/10
[52] U.S. Cl. .................................... 123/256; 123/267; 123/293; 123/495
[58] Field of Search .............. 123/30 B, 27 GE, 32 C, 123/32 SP, 32 ST, 33 B, 139 AJ, 139 A, 143 B, 191 S, 191 SP

[56] References Cited

U.S. PATENT DOCUMENTS

| | | | |
|---|---|---|---|
| 1,375,424 | 4/1921 | Smith . | |
| 1,998,785 | 4/1935 | Mock . | |
| 2,986,134 | 5/1961 | Bernard | 123/32 SP |
| 3,665,902 | 5/1972 | Bloomfield | 123/32 ST |
| 3,905,343 | 9/1975 | Ryan | 123/32 ST |
| 4,061,114 | 12/1977 | Christopher | 123/139 AJ |
| 4,088,099 | 5/1978 | Gruden | 123/32 ST |
| 4,091,772 | 5/1978 | Heater et al. | 123/30 B |
| 4,125,094 | 11/1978 | Noguchi et al. | 123/32 SP |

FOREIGN PATENT DOCUMENTS

| | | | |
|---|---|---|---|
| 290926 | 3/1966 | Australia | 123/32 C |
| 350358 | 7/1937 | Italy | 123/32 SP |
| 595529 | 2/1978 | U.S.S.R. | 123/191 S |

*Primary Examiner*—Charles J. Myhre
*Assistant Examiner*—Andrew M. Dolinar
*Attorney, Agent, or Firm*—Luedeka & Fitch

[57] ABSTRACT

A flaming engine system for an internal combustion engine of the Otto-cycle type comprises primary and secondary pre-ignition chambers serially interposed between an engine cylinder and a spark plug, and self-actuated of means metering high combustible fuel into the primary pre-ignition chamber. The flame commenced in the primary pre-ignition chamber is enhanced and promoted as it is caused to pass into the secondary pre-ignition chamber, then through geometrically designed openings and into the cylinder for ignition of the base-air-fuel mixture contained within the cylinder.

5 Claims, 7 Drawing Figures

METHOD AND APPARATUS FOR ACCOMPLISHING FLAME IGNITION FOR AN INTERNAL COMBUSTION ENGINE

This invention relates generally to internal combustion engines and particularly to systems for igniting the combustible mixture employed therein.

The Otto-cycle engine commonly employed in automotive passenger cars and the like is well known. Similarly, the advantages and disadvantages of such "gasoline engines" are well known. For example, in U.S. Pat. No. 3,665,902, there is set forth a comprehensive discussion of the Otto-cycle engine and, in particular, its disadvantages. Such patent also discusses stratified charge modifications for the Otto-cycle engine. Such patent is incorporated herein by reference in its entirety.

As recognized in the prior art, leaner air to fuel mixtures than are practical in the Otto-cycle engine will increase fuel efficiency, that is, will produce more work per unit of fuel. Such leaner mixtures, however, are difficult to ignite, hence flame ignition has been proposed as one means for igniting such mixtures. It is also recognized in the prior art, that in flame ignition systems for internal combustion engines, the leaner air to fuel mixtures, when ignited, provide relatively slow moving flame fronts. Generally stated, the leaner the mixture, the slower is the flame front.

Because of the relatively slowly moving flame front in flame ignition systems where employing the relatively lean air to fuel mixtures, there also develops the problem of the mixture becoming heated to the extent that pre-ignition and/or detonation may occur. Either of these events is undesirable in that each detracts from the efficiency of the engine operation.

The present inventor has discovered, however, that by means of his method and apparatus, it is possible to employ a relatively lean air-fuel mixture without either pre-ignition or detonation. Generally stated, the present invention comprises primary and secondary pre-ignition chambers interposed between a cylinder of the engine and a spark plug, and pump means actuated by the stroke cycling of the piston within the cylinder to inject into the primary chamber a metered quantity of a highly combustible fuel. The design and relationship of the pre-ignition chambers is such as provides for amplification and propagation of a flame front commenced in the primary chamber and as it moves through the secondary chamber, thence to the cylinder where the main air-fuel mixture is ignited.

In one embodiment of the present invention, the carburetor of an internal combustion engine of the Otto-cycle type is adapted to introduce into the intake manifold a base mixture of air and fuel, usually gasoline, in a relatively lean ratio of air to fuel of about 15 to 1 under engine load and about 20 to 1 under engine idle or deceleration conditions. On the intake stroke of a piston, following evacuation of a majority of the clearance gases, such mixture is drawn into the cylinder and on the compression stroke a portion thereof is caused to leave the cylinder and enter primary and secondary pre-ignition chambers which are interposed serially between the cylinder and a spark plug. The spark plug electrodes occupy the primary chamber. Also, on the compression stroke, there is injected into the primary chamber a metered quantity of a highly combustible fuel which mixes with that portion of the base mixture entering the primary chamber to enrich the same substantially. Firing of the spark plug ignites the mixture in the primary chamber generating a flame which is directed out of the primary chamber through an elongated passageway into the secondary pre-ignition chamber where the flame ignites that quantity of base mixture already in such chamber, thereby generating more flame, more expansion of the gases and increasing pressure within the secondary chamber. As the flame moves through the elongated passageway, there is injected into the moving gas stream additional base mixture from that region of the secondary chamber that is remote from the exit port of the elongated passageway into the secondary chamber, thereby amplifying the flame and enhancing its propogation into the secondary chamber. From the secondary chamber, the flame is directed at a relatively high velocity, through a plurality of openings into the cylinder in a pattern which causes the flame to essentially simultaneously fill the cylinder and ignite essentially all portions of the base charge contained therein simultaneously, thereby providing the desired combustion of the base mixture during that time period when such can produce optimum work.

In one embodiment of the present invention, the invention includes an adaptor having one end suitable for receipt in the conventional spark plug threaded opening in an engine block such that an outboard end of the adaptor projects into the cylinder with its opposite end adapted to receive a conventional spark plug. The adaptor is provided with primary and secondary chamber internally thereof, such chambers being interconnected in fluid communication by means of an elongated passageway. The primary chamber of the adaptor receives the electrode end of the spark plug. The secondary chamber extends to the outboard end of the adaptor and is in fluid communication with the cylinder of the engine by means of a plurality of passageways defined in the wall of the outboard end of the adaptor. Pump means is provided which is actuated by the cycling of the engine to inject a metered quantity of highly combustible fuel into the primary chamber once each operational cycle of the engine and at a time immediately prior to the firing of the spark plug. The elongated passageway between the primary and secondary chambers is connected, by openings through its wall, in fluid communication with a portion of the secondary chamber which is remote from the exit port of such passageway into the secondary chamber. As the flame moves through the passageway, unignited base mixture from the secondary chamber enters the passageway through these openings under the forces developed by the moving gas stream, i.e., Venturi action, and by the expansion of the gases in the secondary chamber as the flame pushes into such chamber and as the base mixture therein ignites and expands. As the pressure within the secondary chamber and in the elongated passageway equilibrates the flame itself propogates from the elongated passageway through the openings in the wall thereof and into the inner regions of the secondary chamber to generate additional pressures tending to force the flame out of the secondary chamber, such that the resultant flame is forced from the secondary chamber through the plurality of openings in the outboard end of the adaptor and into the cylinder in a pattern and at a speed which results in essentially simultaneous ignition of the base mixture in the cylinder.

Accordingly, it is an object of this invention to provide an improved method and apparatus for accomplishing flame ignition in an internal combustion engine. It is another object of the invention to provide for the retrofitting of existing engines to a flame ignition system.

Other objects and advantages of the invention will be recognized from the following description, including the claims and drawings, in which:

FIGS. 2A and 2B are fragmentary, sectional, views of check valves employed in the system shown in FIG. 2;

Figure 1:
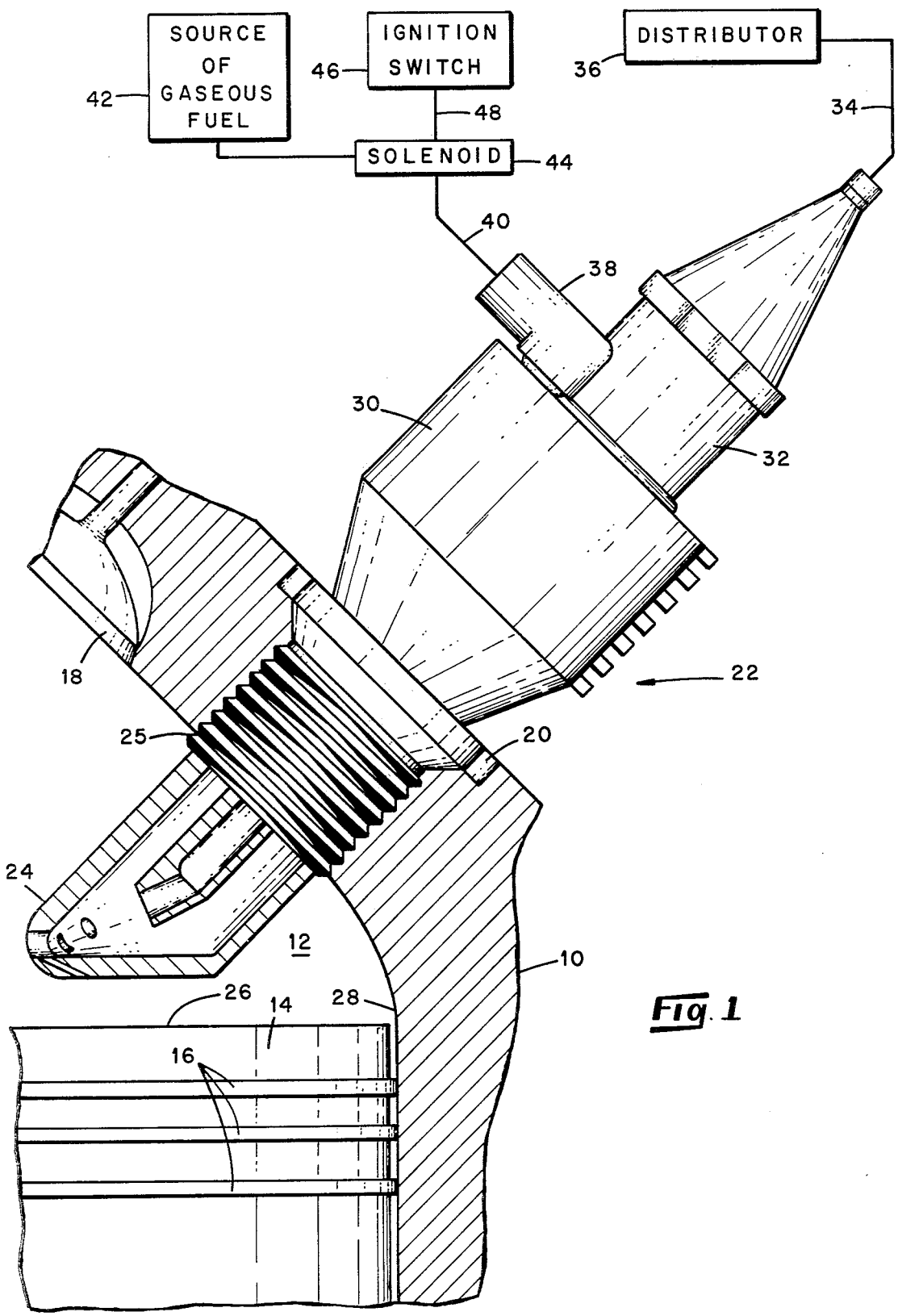
FIG. 1 is a fragmentary, partly cutaway view of a portion of an automobile engine provided with a flame ignition system depicting various features of the present invention.

With reference to FIG. 1, in the depicted embodiment of the present invention, there is shown a fragmentary section of an automobile engine block 10 which defines a cylinder 12 within which there is reciprocatably mounted a piston 14 fitted with appropriate sealing rings 16 as is well known in the art. The depicted engine block section further includes an intake valve 18. As depicted, there is threadably inserted in the internally threaded spark plug opening 20 of the block an adaptor 22 comprising a first end 24 which is externally threaded as at 25 to be received in the internally threaded opening 20 with the outboard end 24 of the adaptor projecting into the cylinder 12 to a position immediately adjacent to the face 26 of the piston 14 when such piston is at top dead center and adjacent the cylinder wall 28. The body 30 of the adaptor 22 is disposed externally of the engine block and serves to threadably receive therein a spark plug 32 connected as by an electrical lead 34 to a distributor 36. The body 30 of the adaptor 22 further threadably receives a fitting 38 to which there is connected a conduit 40 leading to a source of gaseous fuel 42. A solenoid valve 44 is interposed along the length of conduit 40 for controlling the flow of gaseous fuel through the conduit 40 to the fitting 38, actuation of the solenoid valve 44 being by the means of an ignition switch 46 that is connected to the solenoid 44 by an electrical wire 48. The gaseous fuel preferably comprises propane or the like so that, as will be recognized hereinafter, there are minimal requirements imposed in the way of apparatus for distributing such fuel to the several cylinders of an engine. A further, but less desirable, source of highly combustible fuel comprises a quantity of gasoline heated to induce volatilization thereof.

Whereas the embodiment depicted in FIGS. 1 and 2 includes an adaptor for receipt in the normally existing spark plug opening of an engine block, it will be recognized by a person skilled in the art, that the engine block can be initially formed to incorporate therein the various elements of the apparatus disclosed herein as will become more evident hereinafter. Further, it will be recognized that a spark plug may be provided which is of a design different from the conventional spark plug but in any event such will provide an electric arc for ignition purposes.

Figure 2:
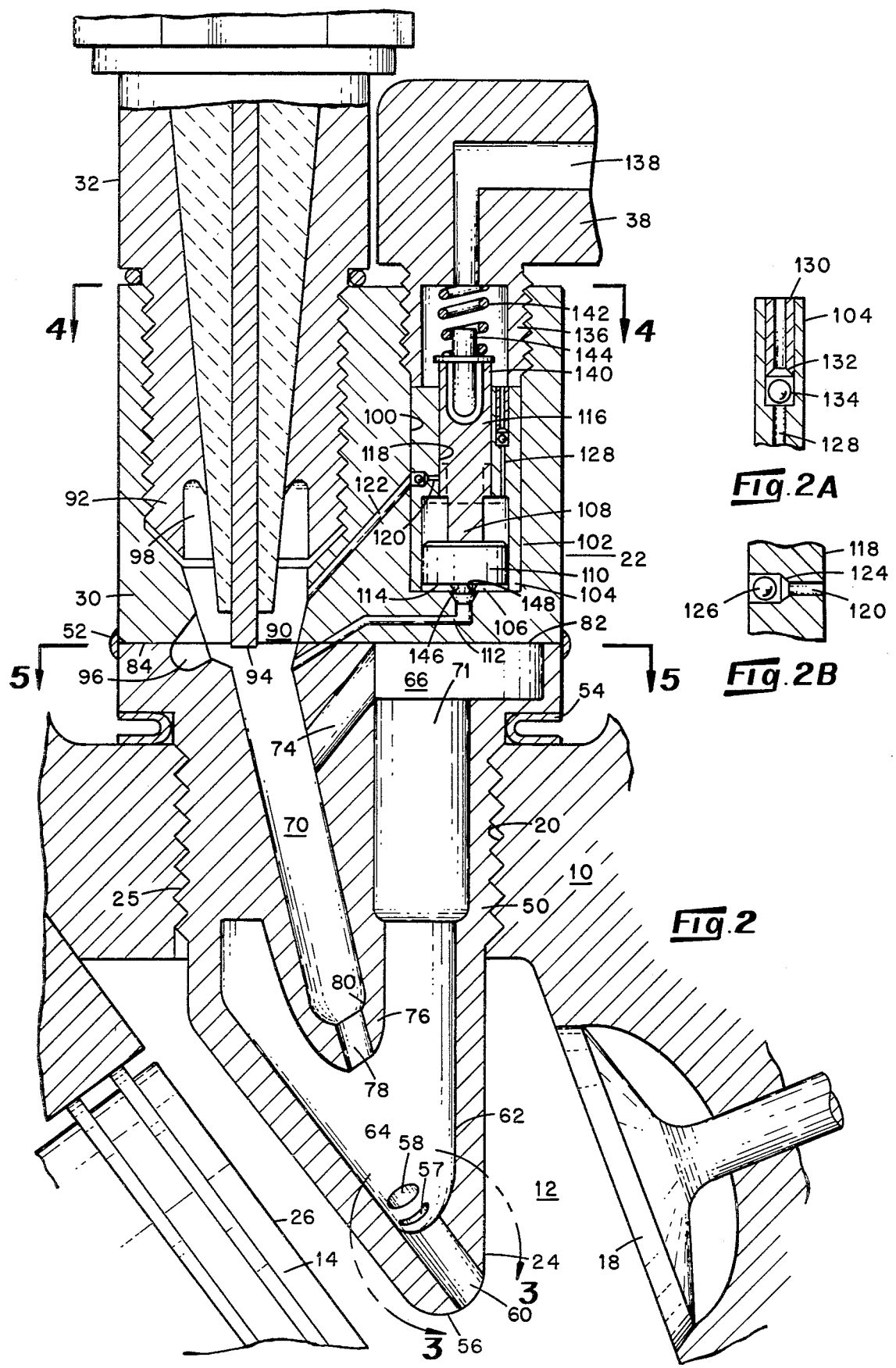
FIG. 2 is a fragmentary, sectional view of a portion of an automobile engine depicting details of the ignition system shown in FIG. 1.
Figure 3:
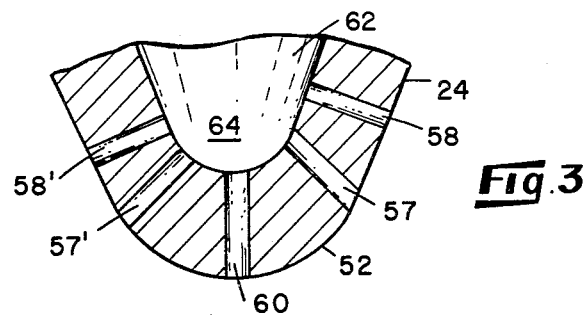
FIG. 3 is a fragmentary, sectional view of the outboard end of an adaptor device as depicted in FIG. 2.
Figure 4:
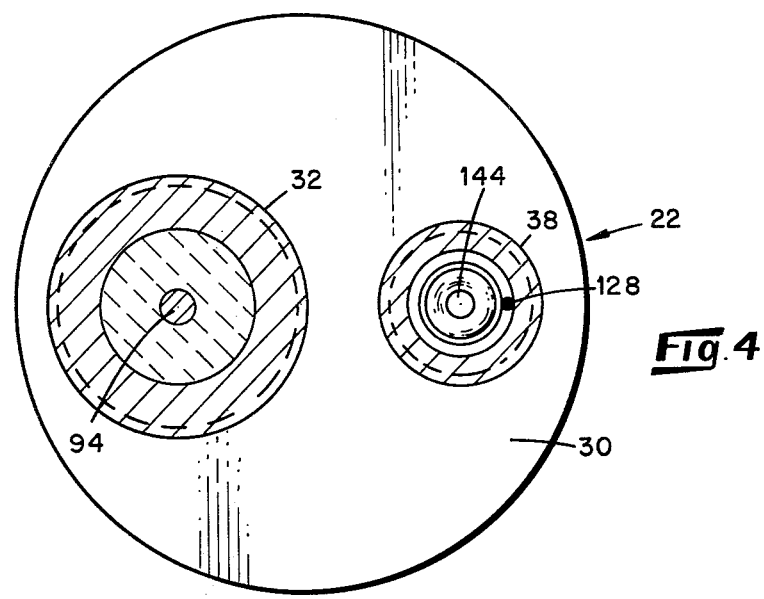
FIG. 4 is a cross-sectional view taken along lines 4—4 of FIG. 2.
Figure 5:
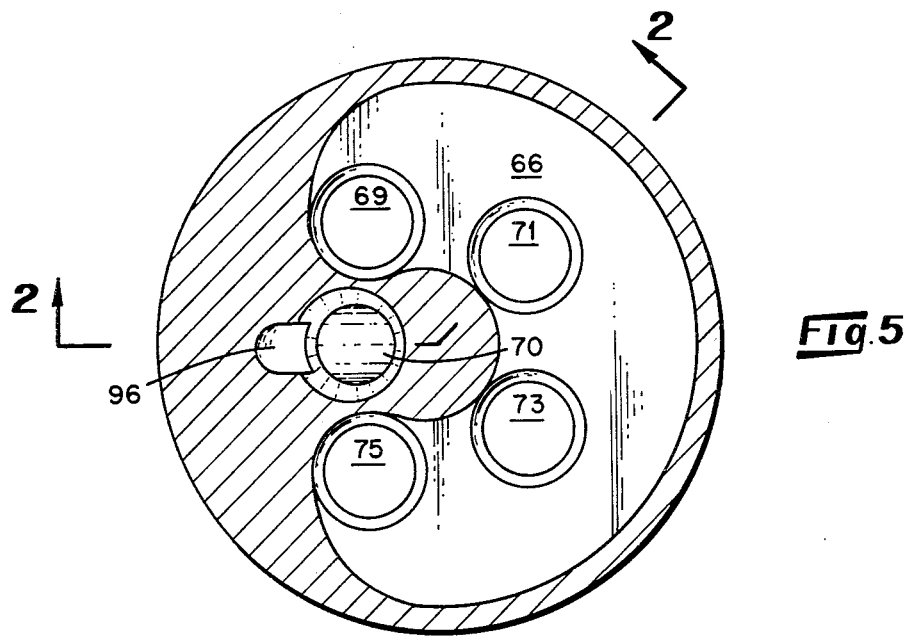
FIG. 5 is a cross-sectional view taken along lines 5—5 of FIG. 2.

With reference to FIG. 2, the depicted adaptor 22 comprises a nose section 50 to which there is joined a body section 30 as by a weld 52. As depicted, the nose section 50 is externally threaded as at 25 to be threadably received within the internally threaded spark plug opening 20 of the engine block 10. Gasket means 54 are provided to ensure a gas-tight seal between the nose section and the block. As noted hereinbefore, the end 24 of the nose section 50 projects into the cylinder 12 of the block 10 with its outboard tip 56 terminating at a location immediately above the face of the piston 14. Such tip 56 is provided with a plurality of openings 58, 59 and 60 through the wall thickness thereof, such openings being oriented with their longitudinal axis lying substantially parallel to the plane of the face 26 of the piston 14 in the depicted embodiment. Internally of the nose section 50, there is defined a secondary pre-ignition chamber 62 which includes substantially two portions, a first portion 64 being located adjacent the tip 56 of the nose section 50 and a second portion being located at the extreme dimension remote from the tip 56. In the depicted embodiment, see FIGS. 2 and 5, the remote portion 66 of the chamber 62 includes an arcuate open space 66 which is connected in fluid communication with the first portion 64 of the secondary chamber by means of one or more individual bores 69, 71, 73 and 75, disposed generally concentrically of the longitudinal axis of the nose section 50 and which form extensions of the chamber portion 64. The space 66 is connected in fluid communication with a substantially central elongated passageway 70, as by a passageway 74. As seen in FIG. 2, the elongated passageway 70 extends generally along the longitudinal axis of the nose section 50 and terminates internally of the chamber 62 in the nature of the nozzle 76 having an exit port 78 which is directed generally in the direction of the tip 56 of the nose section 50. Internally of the elongated passageway 70, there is provided a shoulder 80 which promotes turbulence of gas flowing through the passageway as will be further referred to hereinafter.

Referring again to FIG. 2, it will be noted that the nose section 50 projects out of the block 10 to present a planar face 82. In the depicted embodiment, the body section 30 of the adaptor 22 is provided with a planar face 84 which is disposed in abutting relationship with the planar face 82 of the nose section, and the body and nose sections are joined as by a weld 52. The body section 30 is provided with a bore which, when the two sections are joined one to another, is in register with the elongated passage 70 and forms a continuation thereof. Such bore at its terminal end in part, defines a primary pre-ignition chamber 90 internally of the body 30. In this manner, the primary cavity 90 is in fluid communication with the secondary cavity 62 by means of the elongated passageway 70. The primary chamber 90 is internally threaded to receive the externally threaded end 92 of a conventional spark plug 32 with the exposed electrode 94 thereof disposed within the cavity 90. In the embodiment depicted in FIG. 2, the cavity 90 is further provided with a subcavity 96 which serves as a gas flow turbulence promoter. It is to be noted that when the spark plug 32 is disposed within the cavity 90, the annular space 98 surrounding the electrode 94 of the spark plug is in fluid communication with, and forms an extension of, the cavity 90.

Further, within the body 30, there is defined a generally cylindrical opening 100 within which there is disposed a pump means indicated generally by the numeral 102. In the depicted pump means 102, the cylindrical cavity 100 is provided with a sleeve 104 having its innermost end internally relieved to define an annular cavity 106 concentric with the shaft 108 of a piston member 110 that is received within the sleeve 104 and which is reciprocatable between inner and outer limits of travel. The bottom 106 of the cylindrical cavity 100 is provided with a passageway 112 which extends from the interior of the cavity 100 to, and in fluid communication with, the elongated passageway 70 referred to hereinabove. Accordingly, the innermost face 114 of the piston 110 is in fluid communication with the cylinder 12.

The shaft 108 of the piston 110 is reduced in diameter in the region thereof adjacent the piston 110, thereby enlarging the cavity 106. The body 116 of the shaft 108 is disposed in sliding engagement with the inner wall 118 of the sleeve 104. As seen in FIG. 2, when the piston is disposed at its innermost limit of travel (i.e., when the position of the piston is as depicted in FIG. 2), the reduced diameter portion of the shaft 108 is in register with the enlarged region of the sleeve 104 to define an enlargement of the annular cavity 106. In the depicted embodiment, the fit of the piston 110 and its shaft body 116 within the sleeve 104 are chosen to be such that slight gas leakage therepast provides lubrication therefor. In one embodiment, the propane which is pumped by the pump means 102 is provided with a small amount of lubricating oil.

Within the wall of the sleeve 104, there is provided a passageway 120 leading from the interior of the sleeve, i.e., cavity 100, through the wall thereof to provide fluid communication between the interior of the sleeve 104 and a passageway 122 leading from the passageway 120 through the body section 30 to, and in fluid communication with, the primary pre-ignition chamber 90. In a preferred embodiment, as depicted in detail in FIG. 2B, the passageway 120 is provided with an enlarged diameter section which includes an annular shoulder 124 and which houses a floating ball 126 that functions as a check valve to restrict the flow of gas to a direction outwardly from the interior of the sleeve 104. Further, as depicted in FIG. 2A, the sleeve 104 has defined therein a second passageway 128 having an enlarged diameter portion which is fitted with a further sleeve 130. The sleeve 130 terminates at its innermost end in the form of an annular shoulder 132 to capture within the passageway 128, a ball 134 which functions in the nature of a check valve to restrict the flow of gas to a direction inwardly through the passageway 128. This second passageway 128 provides fluid communication between the annular cavity 106 and the cavity 100, thence to a source of highly combustible fuel.

The sleeves 104 and 130 are maintained in position within the cavity 100 by means of an abutting threaded end section 136 of a fitting 38 which is threadably received within the outermost end of the cavity 100. This fitting 38 is provided with a passageway 138 which is in fluid communication with the interior of the cavity 100, hence in fluid communication with the passageway 128, hence the annular cavity 106. The fitting 38 is further connected by means of a conduit 40 to a source of gaseous fuel as referred to hereinabove. Within the interior of the cavity 100, the outboard end 140 of the shaft 108, hence the piston head 110, is biased, as by a spring 142 inwardly of the cavity 100. As depicted, the spring 142 at one of its ends bears against an adaptor 144 fitted in the end 140 of the shaft 108 and at its other end against the fitting 38. Thereby, the piston 110 is biased toward its innermost limit of travel as depicted in FIG. 2. In this connection, it is noted that the face 114 of the piston 110 is provided with a projection 146 which seats in the open end 148 of the passageway 112 to act as a valve means for opening and closing passageway 112. Further, when the piston 110 is disposed in its outermost limit of travel, as shown in part by dotted lines in FIG. 2, having been forced to such position against the resistance of spring 142, the reduced diameter section of the shaft 108 is in fluid communication simultaneously with the cavity 106 and the first passageway 120, thereby opening the cavity 106 to the elongated passageway 70, hence the primary pre-ignition chamber 90.

In a typical operation of the disclosed system, on the exhaust and intake strokes of the piston 14, substantially all of the gases, burned and unburned, within the cylinder, the primary and secondary pre-ignition chambers 62 and 90, and the several passageways internally of the adaptor 22 are cleared. On the intake stroke of the piston, the intake valve 18 is opened whereby there is drawn into the cylinder 12 a quantity of base air-fuel mixture as is conventional. During the intake stroke, and during the compression stroke of the piston 14, a portion of the base air-fuel mixture within the cylinder 12 is forced through the openings 57, 58 and 60 in the tip of the nose section 24 into the secondary chamber 62, thence into the elongated passageway 70, thence into the primary chamber 90. Such mixture expands to substantially fill all of the unoccupied spaces within the adaptor 22. As the pressure is built up within the cylinder 12 as the compression stroke continues, such pressure is experienced on the face 114 of the piston 110 of the pump means 102 by reason of the exposure of such face to the pressure through the elongated passageway 70 that is connected in fluid communication with the passageway 112 (see FIG. 2). By design, in a typical automobile engine at the time the piston 14 is about 130 to 45 degrees before top dead center on its compression stroke, the pressure experienced by the face 114 of the piston 110 is sufficient to cause the piston to overcome the biasing force of the spring 142 (plus any pressure existing in the cylinder 100) such that the piston moves to its outward limit of travel thereby connecting the annular chamber 106 and the quantity of highly combustible fuel contained therein, in fluid communication with passageways 120, 122 and 70, hence in fluid communication with the pre-ignition chamber 90 and causing a metered quantity of such highly combustible fuel to be injected into the chamber 90 in the immediate vicinity of the electrode 94 of the spark plug 32. By reason of the turbulence chamber 96 and the other protrubences within the chamber 90, there is an immediate mixing of the highly combustible fuel with that portion of the base air-fuel mixture moving into the chamber 90. This injection of the highly combustible fuel into the chamber 90 is timed to precede the firing of the spark plug by a very brief moment of time. Upon the firing of the spark plug, there is ignition of the highly combustible mixture within the chamber 90 and generation of a flame front. As the flame propogates, there is a build up of pressure in the cavity 98 behind the flame front tending to move the flame out of the chamber 90 and through the elongated passageway 70 into the secondary pre-ignition chamber 62, such flame exiting the port 78 of the passageway 70. As the flame moves through the elongated passageway 70, it pulls, by Venturi action, portions of unburned base air-fuel mixture from the cavity 66, and bores 69, 71, 73 and 75 into the passageway 70 via the passageway 74. Within the elongated passageway 70, such unburned base air-fuel mixture is ignited by the flame moving through the passageway thereby enhancing the flame front, increasing the pressure within the elongated passageway 70 to increase the pressure within the secondary pre-ignition chamber 62. Further, as the flame exits port 78 of the passageway 70 into the secondary chamber 62, there is further ignition of the base air-fuel mixture within the secondary chamber which, in turn, expands to force additional unburned base air mixture through the passageway 74 into the passageway 70. Substantially instantaneously, there develops a state of substantial pressure equilibrium within the pre-ignition chambers, and the elongated passageway 70 whereupon the flame existing within the passageway 70 begins to propagate itself back through the passageway 74 to ignite any remaining unburned base air-fuel mixture in the cavity 66 and bores 69, 71, 73 and 75. This flame activity within the adaptor 22 develops relatively large pressures, such that the flame is forced from the secondary chamber 62 through the openings 57, 58, 57', 58' and 60 into the cylinder 12. Notably, the orientation of the openings leading from the secondary chamber 62 into the cylinder 12 is such that the flame exits the chamber 62 in a plurality of streams that fan out into the cylinder 12 in the form of a substantially planar flame which is, in the depicted embodiment, generally parallel to the plane of the face 26 of the piston 14. In this manner, substantially all reaches of the cylinder 12 are subjected to the flame essentially instantaneously so that there is like substantially instantaneous ignition of the base air-fuel mixture contained within the cylinder 12 throughout the cylinder 12. In this manner, even though the base air-fuel mixture is relatively lean, that is, having an air-to-fuel ratio of between about 15 to 1 and 20 to 1, there occurs ignition and combustion of such mixture at a time when and in a manner such that there is available a maximum of force exerted against the piston 14 to cause the engine to do work.

Following the power stroke of the piston, as the pressure within the cylinder 12 reduces sufficiently, the spring 142 moves the piston 110 to its most inward position closing the passageway 112 and simultaneously drawing into the annular chamber 106 a fresh charge of highly combustible fuel in readiness for injection of the primary chamber 90 upon a subsequent compression stroke of the piston 14. It is to be noted, that the injection of the highly combustible fuel, by reason of the pump means disclosed herein, is accomplished by the cycling of the piston 14 so that there is no requirement for a complicated metering system, but rather, the metering occurs by reason of the mechanical structure of the pump means. Neither is there a requirement for a mechanism for timing the metering of the injection of the highly combustible fuel into the pre-ignition chamber 90, again such timing being accomplished by reason of the actuation of the pump means 22 by the operational cycling of the piston 14.

In a typical automobile engine, there will be metered into the primary pre-ignition chamber 90 between about 0.008 and 0.164 milliliters of a highly combustible fuel, such as propane, in a gaseous state. The quantity of propane metered into the primary chamber will vary depending upon the size, i.e., volume of a cylinder of an engine, hence the volume of the base air-fuel mixture employed, but such quantity is chosen to produce at the spark plug a mixture which contains about eight parts of air to one part of fuel (propane plus gasoline). It has been determined by the present inventor that this quantity of propane, when employed in combination with a base air-fuel mixture having an air-to-fuel ratio of between about 15 to 1 and 20 to 1 provides a flame front within the cylinder 12 which ignites such relatively lean base air-fuel mixtures substantially completely. It has been calculated that the flame issues forth through the openings 57, 58, 57', 58' and 60 at a velocity of about 350–700 feet per second and will project a flame a distance of up to about 8–9 inches from the adaptor tip.

In the present system, it is noted that the movement of the flame from the pre-ignition chamber 90 through the elongated passageway 70, thence through the secondary chamber 62 and into the cylinder 12 is accomplished through forces other than mere propagation of the flame itself. Accordingly, the present system is not limited in the speed of movement of the flame front to the propagation speed of the flame, but rather the flame is built up within the pre-ignition chambers and forced therefrom at relatively high velocities into the cylinder 12. For example, in a 1964 Ford Falcon, 200 cu. in. displacement engine having an 8.6 to 1 compression ratio, the main jet on the carburetor was adjusted to reduce the quantity of gasoline entering the carburetor by approximately 30 to 35 percent and the idle jet was closed to reduce the available fuel during idling to about 20 percent of that volume of fuel conventionally employed with such engine. The engine in this example fitted with adaptors as disclosed herein, employing propane as the highly combustible fuel and operating within the disclosed parameters, operated satisfactorily including providing adequate power for climbing relatively steep inclines. Further, in this example, there was no evidence of pre-ignition or detonation even after an extended period of operation of the engine during which there was sufficient time for heat build-up within the engine. The estimated reduction of gasoline consumed by the engine at normal operating throttle was in excess of 25 percent of the gasoline consumption of the engine without the novel adaptors. At idle speeds, the gasoline saving for this engine was estimated at greater than 40 percent. Further, as is recognized in the art, combustion of the relatively lean air-to-fuel mixtures results in fewer pollutants.

In one embodiment of the present system, the inventor provides a vacuum relief valve (not depicted) of conventional design leading from the ambient atmosphere into the carburetor at a location downstream of the butterfly valve of such carburetor to permit the drawing of air from the ambient atmosphere into the carburetor at those times during the operation of the engine when an unusually high vacuum is developed within the carburetor, such as at idle speeds and/or during deceleration, as is well known in the art. By means of this pressure relief valve, the vacuum within the carburetor is relieved to reduce the likelihood of excess gasoline being drawn into the carburetor at times when it is not needed, e.g., during idle or deceleration conditions. Use of such device with conventional ignition systems is impractical due to the inability of these systems to maintain ignition with the resulting lean base air-fuel mixture.

In combination with the present system, it is possible to set the automatic choke on the engine such that it opens sooner thereby reducing the time when the richer air-fuel mixture is being fed to the engine for warm-up.

Also, in one embodiment, the accelerator pump stroke is reduced by about 30 percent to reduce the quantity of gasoline fed to the carburetor during acceleration.

In view of the foregoing disclosure, it will be recognized that the present system overcomes several disadvantages of the Otto-cycle engine. Specifically, it is recognized in the art that in Otto-cycle type engines there is a time loss, "ignition lag", wherein a portion of the base air-fuel mixture in the cylinder ignites too late in the stroke to do work. This results in both loss of efficiency as well as the generation of pollutants. In the present application, the ability to generate a flame and inject this flame into the cylinder at a high velocity and in a pattern that substantially fills the cylinder above the piston face with a flame results in essentially simultaneous ignition of essentially all of the base air-fuel mixture within the cylinder at a time when the expansion of the combusting fuel will accomplish work. By reason of the design of the adaptor tip disclosed herein, the geometrical shape of the flame issuing forth from the adaptor may be selected by varying the diametrical sizes of the openings through the wall of the adaptor tip so that, depending upon the position of the adaptor tip relative to the interior of the cylinder, the flame is caused to essentially evenly fill the cylinder. In addition, as desired, the flame can be caused to enter the cylinder and move throughout the same in a swirling action or in straight lines of movement. A swirling type movement of the flame into the cylinder can provide increased turbulence and more rapid and thorough contact of the flame with the base air-fuel mixture within the cylinder, especially in those cylinders which have the larger volumes, for example, in an aircraft engine cylinder.

As noted herein, there is provided a base air-fuel mixture leaving the carburetor and entering the intake manifold which is in a ratio of at least 15 to 1. Because of this relatively high air-to-fuel ratio, there is provided within this mixture sufficient oxygen for complete combustion of the fuel contained within the mixture. Because of this, there is overcome the disadvantage of unequal distribution of the base air-fuel mixture to the several cylinders of an engine as has been experienced heretofore in the Otto-cycle type engines.

Whereas there has been disclosed herein specific embodiments, it is intended to limit the invention only as recited in the claims appended hereto.

What is claimed is:

1. In a method for igniting the base air-fuel mixture of an internal combustion engine comprising the steps of
   connecting primary and secondary chambers in serial fluid communication with a cylinder of said engine,
   introducing a quantity of said base air-fuel mixture into said chambers,
   positioning an electrode end of a spark plug in said primary chamber,
   injecting a metered quantity of a highly combustible fuel into said primary chamber once during each operational cycle of said engine to mix with said base mixture therein and develop a fuel enriched mixture therein at a time immediately prior to the development of an arc at said electrode end of said spark plug whereby said arc ignites said mixture of highly combustible fuel and base air-fuel mixture to develop a primary flame,
   directing said primary flame along an elongated passageway to said secondary chamber where said flame mixes with said base air-fuel mixture in said chamber to ignite the same and reinforce the flame,
   as said primary flame is moved out of said primary chamber through said passageway, introducing additional unburned base air-fuel mixture from said secondary chamber into said passageway at a location intermediate the opposite ends of said passageway to reinforce said primary flame,
   directing said reinforced flame from said secondary chamber into said cylinder in a pattern which provides flame to substantially all regions of said cylinder above a piston contained therein.

2. The method of claim 1 including the step of providing a base air-fuel mixture which has a ratio of air-to-fuel of at least 20 to 1 under deceleration, but not less than 15 to 1 under load.

3. A method for retrofitting an internal combustion engine of the Otto-cycle type for flame ignition of the base air-fuel mixture employed therewith, said engine including a carburetor and at least one cylinder, comprising the steps of
   adjusting the carburetor of said engine to provide under normal engine load conditions to said engine a base air-fuel mixture having a ratio of air to fuel of not less than 15 to 1,
   reducing the quantity of said fuel available to said engine during idling conditions of said engine to not more than about 70 percent of the quantity normally employed by said engine,
   during the compression stroke of a piston associated with said cylinder, introducing a portion of said base mixture into primary and secondary chambers disposed serially between each cylinder of said engine and a spark plug associated with each such cylinder, said secondary chamber being at least partly disposed within said cylinder and connected in fluid communication with said cylinder by means of a plurality of openings leading from said secondary chamber into said cylinder,
   said primary chamber being fully outside said cylinder and connected in fluid communication with said secondary chamber by an elongated passageway which terminates at a location interiorly of said second chamber,
   introducing a metered quantity of highly combustible fuel into said primary chamber once each operational cycle of said engine whereby firing of said spark plug ignites such fuel and develops a flame,
   directing said flame along said elongated passageway toward said secondary chamber, thence into said secondary chamber,
   as said flame is moving through said elongated passageway, introducing into said passageway at a location intermediate its opposite ends unburned base mixture from said secondary chamber,
   directing said flame from said secondary chamber into said cylinder through said plurality of openings.

4. Apparatus providing for flame ignition of the base air-fuel mixture employed in an internal combustion engine of the Otto-cycle type comprising
   adaptor means comprising an externally threaded first end suitable to be threadably received in an internally threaded spark plug opening to a cylinder of said engine and an internally threaded second end suitable to threadably receive therein a spark plug, said first end of said adaptor projecting into said cylinder when said adaptor is in position in said spark plug opening, means defining a primary chamber adjacent said second end of said adaptor, said chamber receiving therein an exposed electrode end of said spark plug, means defining a secondary chamber adjacent said first end of said adaptor, means defining an elongated passageway that connects said primary and secondary chambers in fluid communication with one another, said elongated passageway terminating at one of its ends at a location spaced inwardly of said secondary chamber such that a portion of said secondary chamber lies generally along a portion of the length of said elongated passageway, means defining a passageway through the wall of said elongated passageway providing fluid communication between said secondary chamber and said elongated passageway at a location intermediate of the ends of said elongated passageway, a source of highly combustible fuel, pump means actuatable by the operational cycling of said engine, means connecting an inlet side of said pump means in fluid communication with said source of highly combustible fuel, means connecting an outlet side of said pump means in fluid communication with said primary chamber whereby said pump means injects a metered quantity of said highly combustible fuel into said primary chamber once each operational cycle of said engine.

5. The apparatus of claim 4 wherein said pump means comprises means defining a pump cavity within said adaptor means, piston means disposed within said pump cavity and reciprocatable between inward and outward limits of travel therein, said piston means including a head portion disposed in sliding and sealing engagement with the internal wall of said pump cavity adjacent the innermost end thereof, shaft means joined to said head means and extending therefrom and in sliding engagement with the internal wall of said pump cavity, means including a reduced cross-sectional area of a portion of the length of said shaft means defining an annular cavity circumscribing said shaft means at a location adjacent the joinder of said shaft means to said head means, means defining a first passageway providing fluid communication between the innermost end of said pump cavity on one side of said piston head means and said elongated passageway that connects said primary and secondary chambers, means defining a second passageway providing fluid communication between said primary chamber and said pump cavity at a location outside said annular cavity when said piston head is disposed in its outward limit of travel within said pump cavity, and which is blocked by said shaft means when said piston head is disposed in its inward limit of travel within said pump cavity.

* * * * *